US006994454B2

(12) United States Patent
Kinouchi

(10) Patent No.: US 6,994,454 B2
(45) Date of Patent: Feb. 7, 2006

(54) VEHICULAR CORNERING LAMP

(75) Inventor: Toshiyuki Kinouchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 147 days.

(21) Appl. No.: 10/383,584

(22) Filed: Mar. 10, 2003

(65) Prior Publication Data

US 2003/0174493 A1 Sep. 18, 2003

(30) Foreign Application Priority Data

Mar. 15, 2002 (JP) .......................... P.2002-071345

(51) Int. Cl.
*F21V 11/00* (2006.01)

(52) U.S. Cl. ...................... 362/351; 362/301; 362/303; 362/343; 362/522; 362/518; 362/539; 362/529

(58) Field of Classification Search .................. 362/36, 362/464, 466, 467, 248, 241, 247, 509, 516, 362/346, 351, 303, 343, 522, 529, 539, 523, 362/518; 313/113, 114, 115, 315, 316, 579
See application file for complete search history.

(56) References Cited

U.S. PATENT DOCUMENTS 5,055,981 A * 10/1991 Nino .......................... 362/539
5,220,237 A * 6/1993 Maseki et al. .............. 313/113
5,660,462 A * 8/1997 Bockley et al. ............. 362/256
5,988,837 A * 11/1999 Eichhorn et al. ........... 362/464
6,076,945 A * 6/2000 Matsubara et al. ......... 362/346
6,365,718 B1 * 4/2002 Whitham et al. ........... 534/575
2002/0039289 A1 4/2002 Kinouchi
2002/0163814 A1 * 11/2002 Hayami et al. ............. 362/466
2003/0090905 A1 * 5/2003 Uchida et al. .............. 362/465

* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

A vehicular cornering lamp which radiates beams having different light distribution patterns in accordance with different driving conditions such as different driving speed ranges. A bulb shade blocks light from a front filament from reaching a lower reflecting area on a reflecting surface of the reflector of the lamp while allowing light from the front filament to strike only an upper reflecting area, while an upward light blocking shade provided above and adjacent the light source bulb blocks light from the rear filament from reaching the upper reflecting area while allowing light from the rear filament to strike only the lower reflecting area. The active area of the reflecting surface of the reflector can be changed by switching illumination between the front filament and the rear filament.

15 Claims, 10 Drawing Sheets

TURNING AT LOW SPEED

TURNING AT MEDIUM AND HIGH SPEEDS

TILTED AXIS OF BULB

DIFFUSION AND DEFLECTION CONTROL

TURNING AT LOW SPEED

TURNING AT MEDIUM AND HIGH SPEEDS

STRAIGHT DRIVING AT LOW SPEED

STRAIGHT DRIVING AT MEDIUM AND HIGH SPEEDS

TURNING AT LOW SPEED
PRIOR ART

TURNING AT MEDIUM AND HIGH SPEEDS
PRIOR ART

VEHICULAR CORNERING LAMP

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp which is configured so as to provide a beam of light on a road surface in front of the vehicle with a predetermined light distribution pattern while the vehicle is turning or executing a corner.

Conventionally, a cornering lamp, which is a vehicular lamp other than a headlamp, has been known which provides a beam on the road surface in front of the vehicle when the vehicle is turning, thus increasing the visibility of the road surface in the turning direction.

FIGS. 11A and 10B show light distribution patterns Pa' formed on the road surface in front of a vehicle by a beam from a conventional cornering lamp produced when the vehicle is making a left turn.

Specifically, FIG. 10A shows the light distribution pattern produced when the vehicle is just starting to enter an intersection and turn to the left at a low speed, and FIG. 10A shows the light distribution pattern when the vehicle is turning to the left at a medium or high speed. A light distribution pattern P (L) shown by chain double-dashed lines in FIGS. 10A and 10B is a low-beam light distribution pattern formed by the headlamp.

The light distribution pattern Pa' is formed so as to spread in a downwardly slanting direction from the vicinity of a hot zone (high light intensity area) HZ (L) toward the left. There is also a hot zone HZa' at the upper right side in the light distribution pattern. As a result, good visibility on the road surface in front of the vehicle in the turning direction is ensured while driving from low speeds to medium and high speeds.

However, the conventional cornering lamp, which is configured so as to radiate a beam in a single light distribution pattern Pa', has the following problems.

When a vehicle turns while traveling at a low speed with the driver's eyes directed to the road surface over a short distance, visibility is decreased due to the brightness of an area A1 on the far side of the light distribution pattern Pa'. In addition, when the vehicle turns while traveling at medium and high speeds with the driver's eyes directed to the long distance road surface, visibility is decreased due to the brightness of an area A2 on the closer side of the light distribution pattern Pa'.

These problems can also occur in the case of a vehicular lamp other than a cornering lamp.

BRIEF SUMMARY OF THE INVENTION

In view of the foregoing problems, it is an object of the present invention to provide a cornering lamp which is configured so as to provide a light beam on the road surface in front of a vehicle having a light distribution pattern determined in accordance with current vehicle driving conditions such as speed.

In order to achieve the aforementioned and other objects, a cornering lamp according to the present invention comprises a light source bulb having two filaments and a shade, and a reflector whose reflecting surface has portions corresponding to each of the filaments, wherein one of two different light distribution patterns is selected depending on which filament is illuminated.

That is, a vehicular lamp according to the present invention includes a light source bulb and a reflector which has a reflecting surface for reflecting light from the light source bulb and which is configured so as to radiate light beams toward a road surface in front of the vehicle in predetermined light distribution patterns. The light source bulb includes a front filament and a rear filament which are disposed substantially in series along a central axis of the bulb, and a bulb shade which is provided below and adjacent the front filament for blocking light from the front filament from reaching a lower reflecting area of the reflecting surface while allowing light to strike only the upper reflecting area of the reflecting surface. A second shade is provided above and adjacent the light source bulb for blocking light from the rear filament from reaching the upper reflecting area so as to allow light to strike only the upper reflecting area of the reflecting surface. A first light distribution pattern formed on the road surface in front of the vehicle by light reflected from the upper reflecting area when the front filament is illuminated is farther from the vehicle than a second light distribution pattern formed on the road surface in front of the vehicle by light reflected from the lower reflecting area when the rear filament is illuminated.

The specific configuration of the aforementioned cornering lamp is not especially limited so long as it includes a light source bulb and a reflector which reflects light from the light source bulb forward. Also, the light distribution may be controlled mainly by the reflector or mainly by a lens provided in the front of the reflector.

Further, the inventive cornering lamp may be illuminated only when a headlamp is illuminated or illuminated independently of the headlamp. In addition, the lamp may be illuminated only under predetermined vehicle driving conditions such as turning while driving or the like, or illuminated constantly.

The specific configuration of the light source bulb is not especially limited so long as it includes a front filament, rear filament and a bulb shade. For example, a halogen bulb of the so-called H4 type or the like can be used.

The specific configuration such as the shape, size or the like of the upper reflecting area and lower reflecting area are not especially limited. Also, the specific configuration, such as the shape, size, light intensity distribution or the like, is not especially limited for the light distribution patterns formed by light reflected from the upper reflecting area and the lower reflecting area.

A vehicular lamp according to the present invention has a configuration in which the light source bulb includes a front filament and a rear filament positioned substantially in series along a central axis of the bulb and a bulb shade provided below and adjacent the front filament for blocking light from the front filament radiated in the direction of a lower reflecting area of the reflecting surface so as to allow light from the front filament to strike only the upper reflecting area of the reflecting surface, and a second shade is provided above and adjacent of the light source bulb for blocking light from the rear filament radiated toward the upper reflecting area so as to allow light from the rear filament to strike only the upper reflecting area. Therefore, the usable area of the reflecting surface of a reflector can be changed by switching the lighting between the front filament and the rear filament. That is, when the front filament is illuminated beam can be irradiated by using the upper reflecting area, while when the rear filament is illuminated beam can be irradiated by using the lower reflecting area.

In addition, the vehicular lamp is configured such that a first light distribution pattern which is formed on the road surface in front of a vehicle by light reflected from the upper reflecting area when the front filament is illuminated, is formed farther from the vehicle than a second light distribution pattern which is formed on the road surface in front of the vehicle by light reflected from the lower reflecting area when the rear filament is illuminated. As a result, the first light distribution pattern has a clear cut-off line caused by the bulb shade disposed adjacent to the front filament, and a high light intensity area is formed along the cut-off line. Therefore, long distance visibility of the road surface in front of the vehicle is increased by forming the first light distribution pattern farther from the vehicle than the second light distribution pattern.

In this manner, in a vehicular cornering lamp according to the present invention which radiates beams toward the road surface in front of the vehicle in predetermined light distribution patterns, beams can be radiated in different light distribution patterns in accordance with vehicle driving conditions. As a result, the visibility of the road surface in front of the vehicle can be increased. Moreover, this effect can be achieved with a very simple configuration of filament switching using a single light source bulb.

If the light source bulb is supported by the reflector with the central axis thereof tilted upward with respect to the optical axis of the reflector at a predetermined angle, the usable luminous flux of the front filament can be increased. In addition, if a light source bulb such as a halogen bulb of the H4 type having a bulb shade that surrounds the front filament at a center angle of less than 180° is employed, it is easily possible to form the first light distribution pattern with a horizontal cut-off line on the upper end edge. Also, a high light intensity area can be formed below and in the vicinity of the horizontal cut-off line.

Moreover, if the diffusion angle in the horizontal direction of the first light distribution pattern is made smaller than the diffusion angle in the horizontal direction of the second light distribution pattern, the road surface at a long distance can be illuminated with sufficient brightness, while the short distance area can be illuminated widely with appropriate brightness.

Further, if the rear filament is illuminated when the vehicle speed is equal to or less than a predetermined vehicle speed, and if the front filament is illuminated when the vehicle speed is greater than the predetermined vehicle speed, while driving at low speeds when the eyes of the driver are on the short distance road surface, the short distance road surface will be broadly and substantially uniformly illuminated and most of the long distance road surface is not illuminated. On the other hand, while driving at medium and high speeds when the eyes of the driver are on the long distance road surface, the long distance road surface will be illuminated brightly and most of the short distance road surface is not illuminated. Thus, visibility can be further increased by illuminating the road surface in front of the vehicle with light distribution patterns appropriate to current speed.

The cornering lamp according to the present invention is not limited to a specific type of lamp, and it may be combined with a headlamp in practice. However, if the cornering lamp radiates light beams toward the front in the turning direction when the vehicle is turning, the visibility of the road surface in front of the vehicle in the turning direction can be sufficiently ensured, thus increasing driving safety. Turning as used herein of course applies with respect to the state where the vehicle is actually turning. In addition, a state where a vehicle has not yet started turning but it is evident that turning will start in the near future, for example, when a turn signal lamp is in operation, may be also included.

Further, if the second light distribution pattern is made to extend further in the widthwise direction of the vehicle than the first light distribution pattern, while driving at low speeds when the eyes of the driver are on the short distance road surface, the visibility of the short distance road surface in front of the vehicle in the turning direction can be sufficiently ensured, while when driving at medium and high speeds when the eyes of the driver are on the long distance road surface, the visibility of the long distance road surface in front of the vehicle in the turning direction is also sufficient.

DETAILED DESCRIPTION OF THE INVENTION

A preferred embodiment of a vehicular lamp constructed according to the present invention will be explained with reference to the accompanying drawings.

Figure 1:
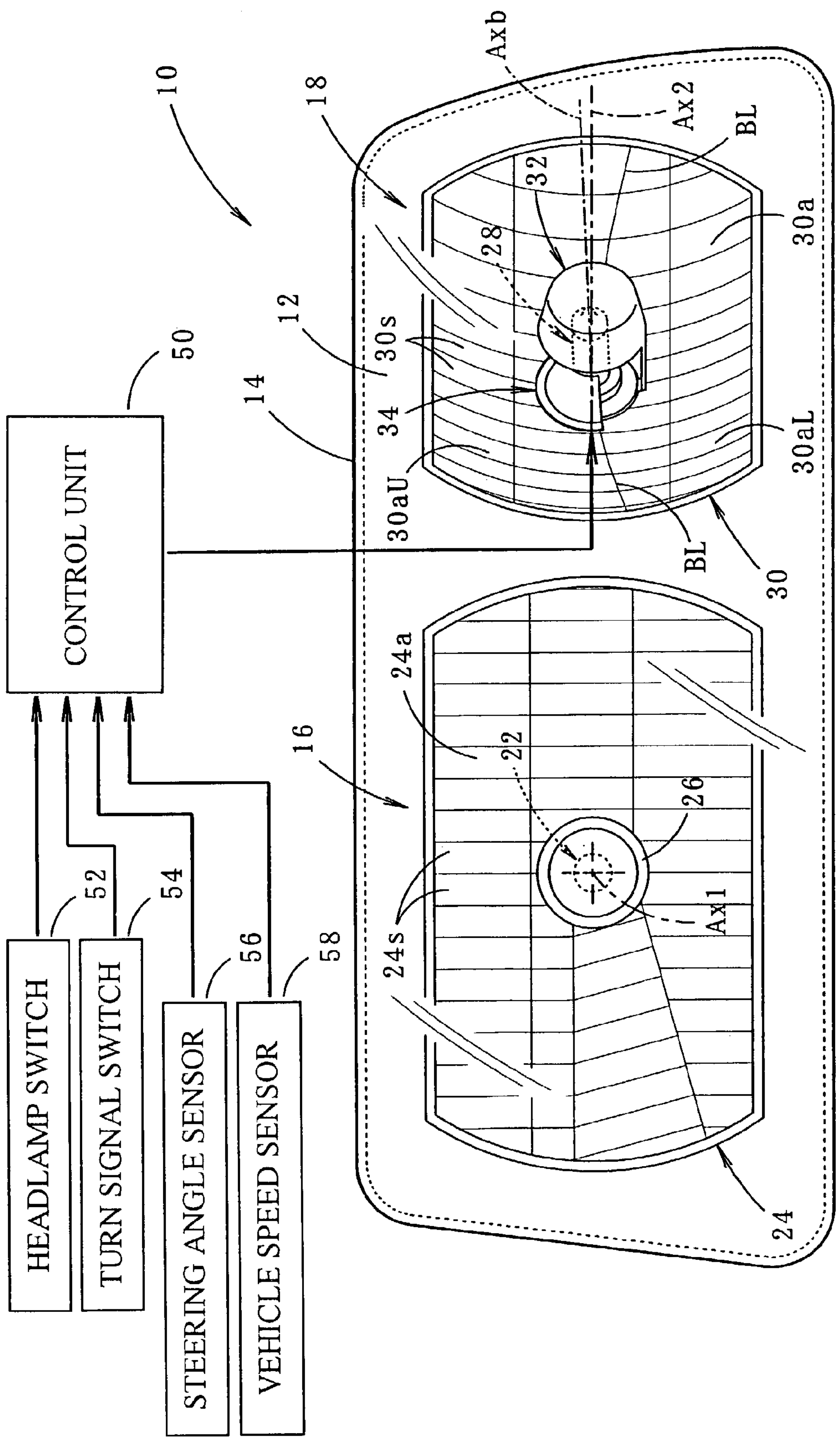
FIG. 1 is a front view of a vehicular lamp and a control system for the vehicular lamp constructed according to a preferred embodiment of the invention.

FIG. 1 is a front view of a preferred embodiment of a vehicular lamp 10 of the present invention along with a control system for the lamp.

As shown in the FIG. 1, the vehicular lamp 10, which is designed to be mounted on the left side of the front portion of a vehicle, functions both as an ordinary headlamp and as a cornering lamp which provides a beam in front of the vehicle in the turning direction when the vehicle is executing a turn.

More specifically, in the vehicular lamp 10 a headlamp unit 16 and a cornering lamp unit 18 are accommodated in a lamp chamber formed by a plain translucent cover 12 and a lamp body 14. As will be described in more detail below, beam radiation from the cornering lamp 18 is controlled by a control unit 50 in accordance with current driving conditions.

The headlamp unit 16, which includes a light source bulb 22 (for example, a H4 type halogen bulb), a reflector 24, and a direct light blocking shade 26, is supported so as to be tiltably adjustable in horizontal and vertical directions relative to the lamp body 14 by an aiming mechanism (not shown). For normal aiming, the aiming position of the headlamp unit 16 is adjusted such that its optical axis Ax1 is directed downward by a small angle (approximately 0.5 to 0.6°) with respect to the forward longitudinal direction of the vehicle.

Figure 6A:
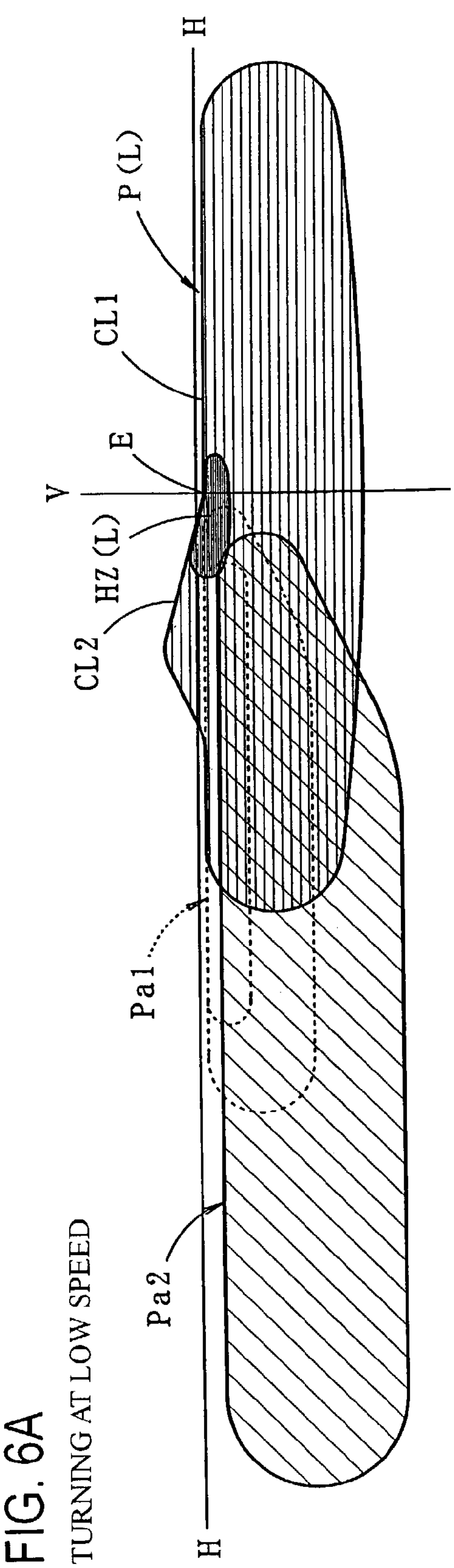
FIG. 6A shows first and second light distribution patterns formed by the cornering lamp unit on virtual vertical screen set 25 m in front of the lamp.
Figure 6B:
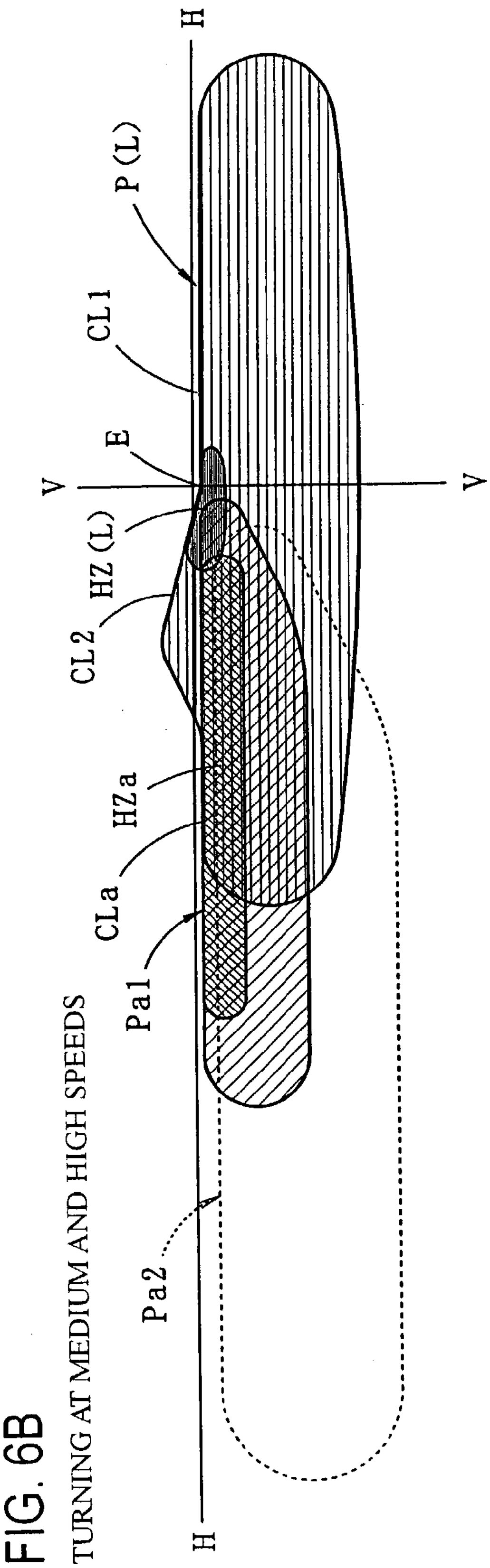
FIG. 6B shows a low-beam light distribution pattern formed by a headlamp unit on such a screen.

The reflector 24 includes a reflecting surface 24*a* containing a plurality of reflective elements 24*s* formed on a paraboloid of revolution where the optical Ax1 is the central axis. The reflecting surface 24*a* reflects light from the light source (filaments for high and low beams) of the light source bulb 22 a diffused and deflected manner so as to form a beam which is directed toward the front of the vehicle in a predetermined light distribution pattern (headlamp light distribution pattern). A low-beam light distribution pattern P (L) as shown in FIGS. 6A and 6B is formed when the filament for the low beam is illuminated.

The cornering lamp unit 18 is mounted adjacent the headlamp unit 16 in the widthwise direction of the vehicle and illuminated when the vehicle is turning to the left under the condition that the headlamp unit 16 is illuminated.

The cornering lamp unit 18, which includes the light source bulb 28, the reflector 30, the direct light blocking shade 32, and an upward light blocking shade 34, is supported by the lamp body 14 in such a manner that the optical axis Ax2 is directed slightly downward (at an angle of approximately 0.5 to 0.6°) with respect to the longitudinal direction of the vehicle and faces outward in the widthwise direction of the vehicle (leftward direction) at a predetermined angle (approximately 30°).

Figure 2:
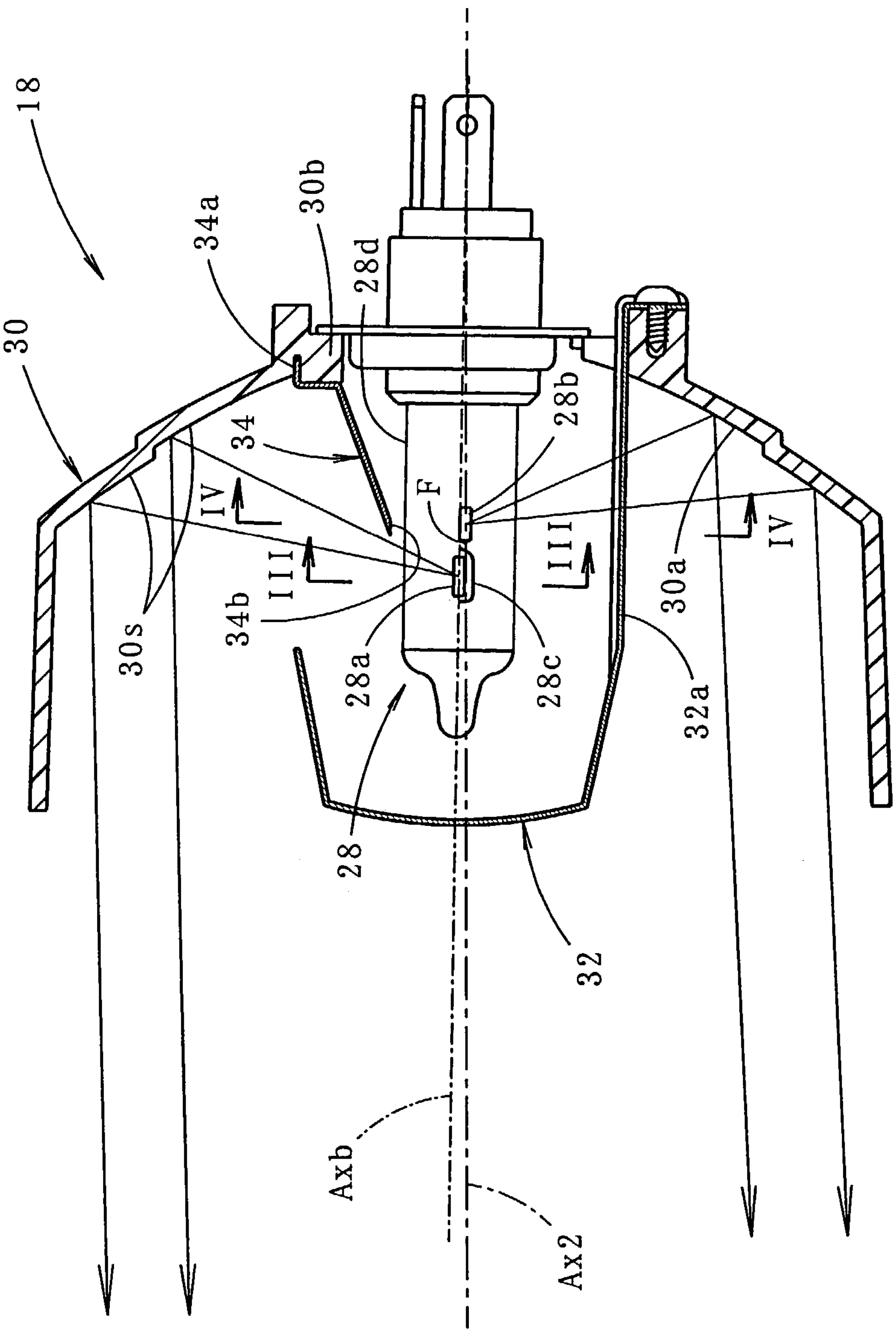
FIG. 2 is a lateral cross-sectional view showing a single cornering lamp unit of the vehicular lamp of FIG. 1.
Figure 3:
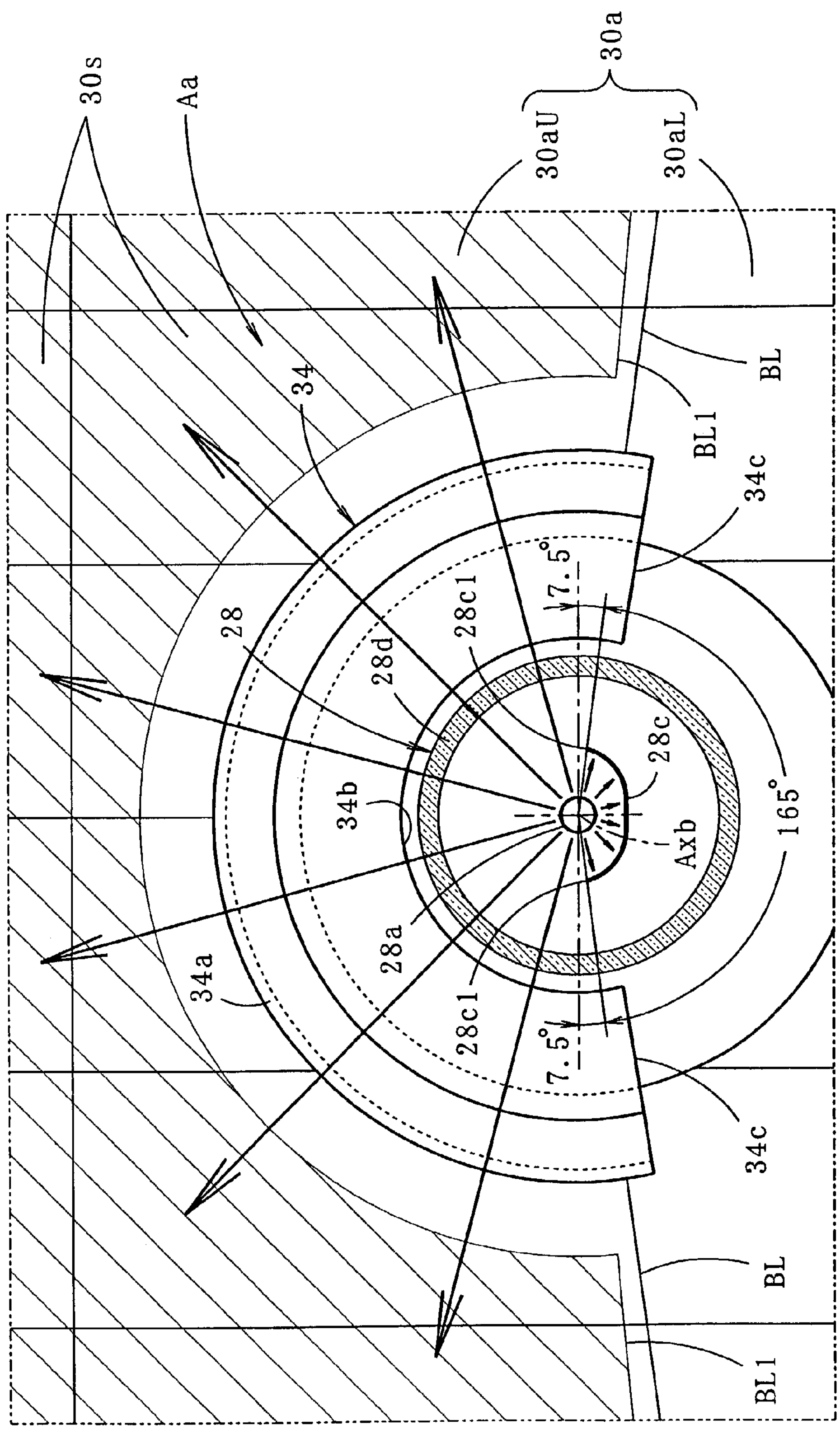
FIG. 3 is a cross-sectional view taken along a line III—III in FIG. 2.
Figure 4:
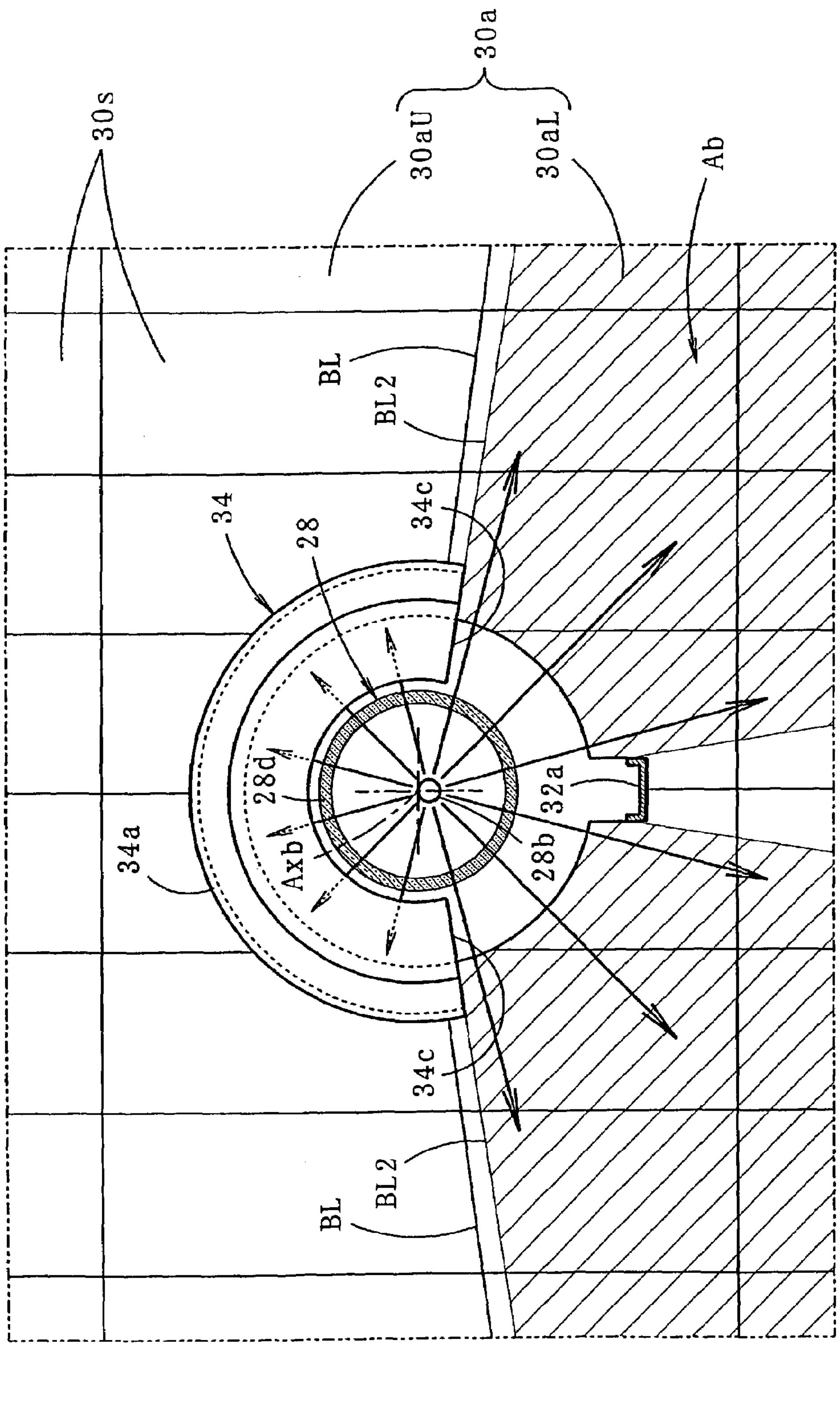
FIG. 4 is a cross-sectional view taken along a line IV—IV in FIG. 2

FIG. 2 is a side sectional view showing a single cornering lamp unit 18, and FIGS. 3 and 4 are sectional views taken along line III—III and line IV—IV, respectively, in FIG. 2.

As shown in these drawings, the light source bulb 28 is a halogen bulb of the H4 type. The bulb has a front filament 28*a* and a rear filament 28*b*, which are positioned serially along the bulb central axis Axb of the light source bulb 28, and a bulb shade 28*c*, which is mounted below and in the vicinity of the front filament 28*a*. The two filaments 28*a* and 28*b* and the bulb shade 28*c* are accommodated in a cylindrical glass tube 28*d*. The bulb 28 is attached by insertion into a bulb attachment insertion portion 30*b* in a rear top portion of the reflector 30 to mount it on the reflector 30.

The front filament 28*a* extends along the bulb central axis Axb, while the rear filament 28*b* is disposed slightly below the bulb central axis Axb in the region behind the front filament 28*a*. The bulb shade 28*c* is formed so as to surround the front filament 28*a* at a center angle of 165° around the bulb central axis Axb, thus blocking light which would otherwise pass downward from the front filament 28*a*.

As shown in FIG. 3, the light source bulb 28 is fixed and supported with respect to the reflector 30 with both upper end edges 28*c*1 of the bulb shade 28*c* at the same height (that is, at an angular position 7.5° below the bulb central axis Axb and slanted downward in rightward and leftward directions, respectively). In addition, as shown in FIG. 2, the light source bulb 28 is fixed and supported with respect to the reflector 30 such that the bulb central axis Axb is tilted slightly upward (at an angle of approximately 1.5°) with respect to the optical axis Ax2. The tilting of the axis is accomplished by forming the bulb attachment insertion portion 30*b* of the reflector 30 with a suitable inclination.

The reflector 30 has a reflecting surface 30*a* formed with a plurality of reflective elements 30*s* on a paraboloid of revolution which has an optical axis Ax2 as its central axis and a focal point F in the vicinity of the front end position of the rear filament 28*b* on the optical axis Ax2. Light from the front filament 28*a* or the rear filament 28*b* is reflected in a diffused and deflected manner toward the front by the reflecting surface 30*a*. The reflecting surface 30*a* is divided into an upper reflecting area 30*a*U and a lower reflecting area 30*a*L by a pair of boundary lines BL which extend below the optical axis Ax2 and are slanted downward in rightward and leftward directions, with the apex formed between the two lines at the center.

The boundary line BL is slightly lower than a light/shade boundary line BL1 formed on the reflecting surface 30*a* by both upper end edges 28*c*1 of the bulb shade 28*c* when the front filament 28*a* is illuminated. As a result, light from the front filament 28*a* radiated in the direction of the lower reflecting area 30*a*L is blocked by the bulb shade 28*c* and only light which strikes the upper reflecting area 30*a*U is allowed to pass.

The direct light blocking shade 32 is disposed in front of the light source bulb 28 so as to block direct light from the front filament 28*a* and the rear filament 28*b* which would otherwise radiate frontward of the lamp. The direct light blocking shade 32 is attached by screws to the reflector 30 via a stay 32*a* which extends rearward from the bottom end portion of the shade.

The upward light blocking shade 34 is disposed above and in the vicinity of the light source bulb 28. The light blocking shade 34, whose center is located on the bulb central axis Axb, substantially surrounds the upper half of the light source bulb 28 in a conical shape. The light blocking shade 34 is press-fitted to the reflector 30 via a rear peripheral flange portion 34*a*. The circular front face 34*b* of the upward light blocking shade 34 extends to a position adjacent a cylindrical glass tube 28*d* above the front end of the rear filament 28*b*. The bottom end face 34*c* on both right and left sides of the upward light blocking shade 34 extends below the central axis line of the rear filament 28*b* slanted downward in rightward and leftward directions, with the apex formed at its center.

As shown in FIG. 4, the upward light blocking shade 34 blocks light from the rear filament 28*b* to the upper reflecting area 30*a*U so as to allow light to strike only the lower reflecting area 30*a*L. The positions of both right and left bottom end faces 34*c* are such that the light/shade boundary line BL2, which is formed on the reflecting surface 30*a* by the upward light blocking shade 34, is slightly lower than the boundary line BL. The upward light blocking shade 34 allows light from the front filament 28*a* to reach the upper reflecting area 30*a*U, except for light directed toward to the inner peripheral portion.

Figure 5:
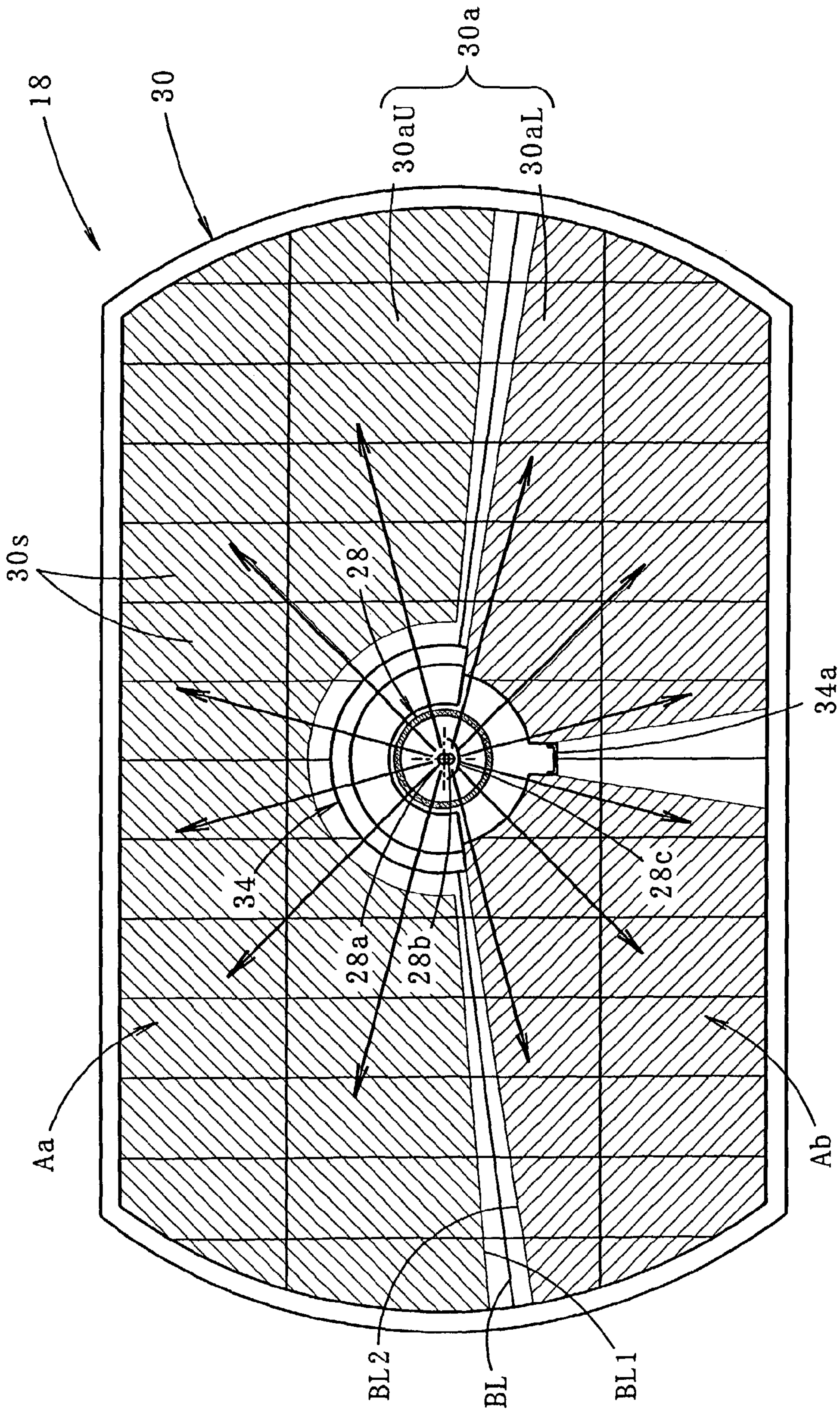
FIG. 5 is a front view of the cornering lamp unit from the front in the direction of its optical axis.

FIG. 5 is a front view of the cornering lamp unit 18 showing the light pattern on the reflecting surface 30*a* radiated from the front filament 28*a* and the rear filament 28*b* of the cornering lamp unit 18*b* when the respective filaments are illuminated.

In FIG. 5, a hatched area Aa is illuminated when the front filament 28*a* is illuminated, while a hatched area Ab is illuminated when the rear filament 28*b* is illuminated. The area Aa covers substantially all portions of the upper reflecting area 30*a*U, that is, portions other than the vicinity of the boundary line BL and the area shaded by the upward light blocking shade 34. The shaded area Ab covers substantially all portions of the lower reflecting area 30*a*L, that is, portions other than the vicinity of the boundary line BL and the area shaded by a stay 32*a* of the direct light blocking shade 32.

FIGS. 6A and 6B show a light distribution pattern formed by the cornering lamp unit 18 on a virtual vertical screen set 25 m in front of the lamp and a low-beam light distribution pattern P (L) formed by the headlamp unit 16.

More specifically, FIG. 6A shows the second light distribution pattern Pa2 formed by light reflected from the lower reflecting area 30*a*L when the rear filament is illuminated, and FIG. 6B shows the first light distribution pattern Pa1 formed by light reflected from the upper reflecting area 30*a*U when the front filament 28*a* is illuminated.

The low-beam light distribution pattern P (L) has a horizontal cut-off line CL1, an oblique cut-off line CL2 on its upper end portion, and an elbow point E at the intersection of the cut-off lines slightly downward (0.5 to 0.6°) of a H–V intersection (directly frontward direction of the lamp). A hot zone HZ is formed in the low-beam light distribution pattern P (L) surrounding the elbow point E primarily on the left side.

The first light distribution pattern Pa1, which is a light distribution pattern of relatively high intensity, extends from the position of the hot zone HZ of the low-beam light distribution pattern P (L) to the left in a relatively flat shape below and in the vicinity of the H—H line (a horizontal line which passes through the H–V intersection point). The upper end edge of the first light distribution pattern Pa 1 is formed as a horizontal cut-off line CLa which extends in the horizontal direction to substantially the same height as the horizontal cut-off line CL1 of the low-beam light distribution pattern P (L). In addition, a hot zone HZa is formed in the first light distribution pattern Pa1 having an oblong configuration and extending in the horizontal direction along the horizontal cut-off line CLa.

The second light distribution pattern Pa2, which has a substantially uniform light intensity, covers a larger angle in the horizontal direction than the first light distribution pattern Pa1. Also, the second light distribution pattern Pa2 is formed such that the right end portion overlaps the left front end of the low-beam light distribution pattern P (L) at a slightly downward position on the left side (outward in the widthwise direction of the vehicle) with respect to the first light distribution pattern Pa1.

Figure 7A:
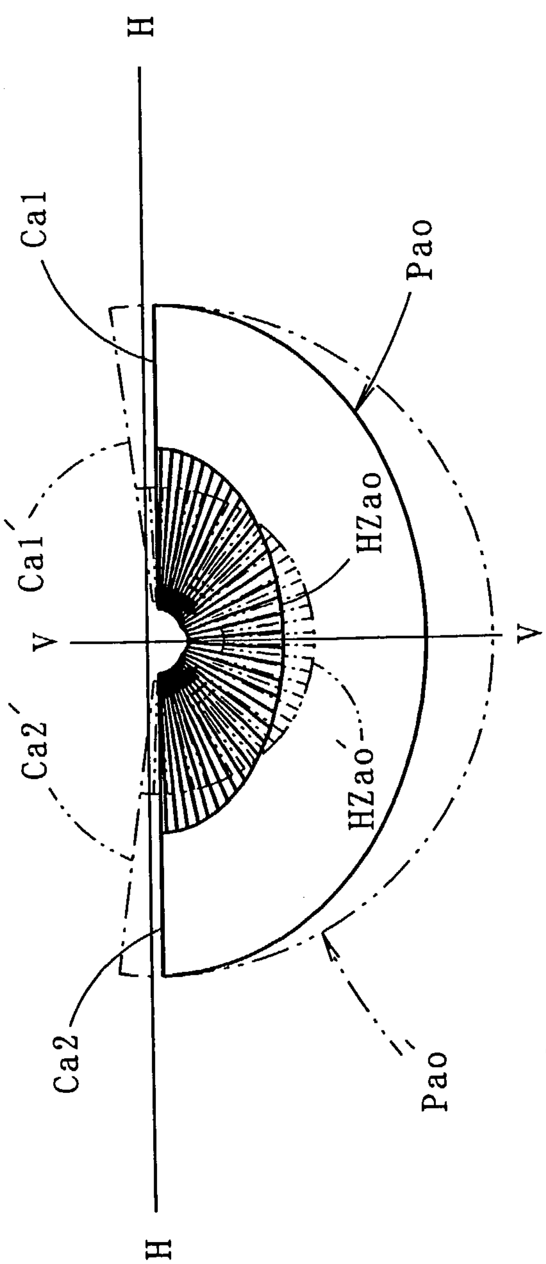
FIGS. 7A and 7B show a first light distribution pattern and illustrate the manner of production of the first light distribution pattern.
Figure 7B:
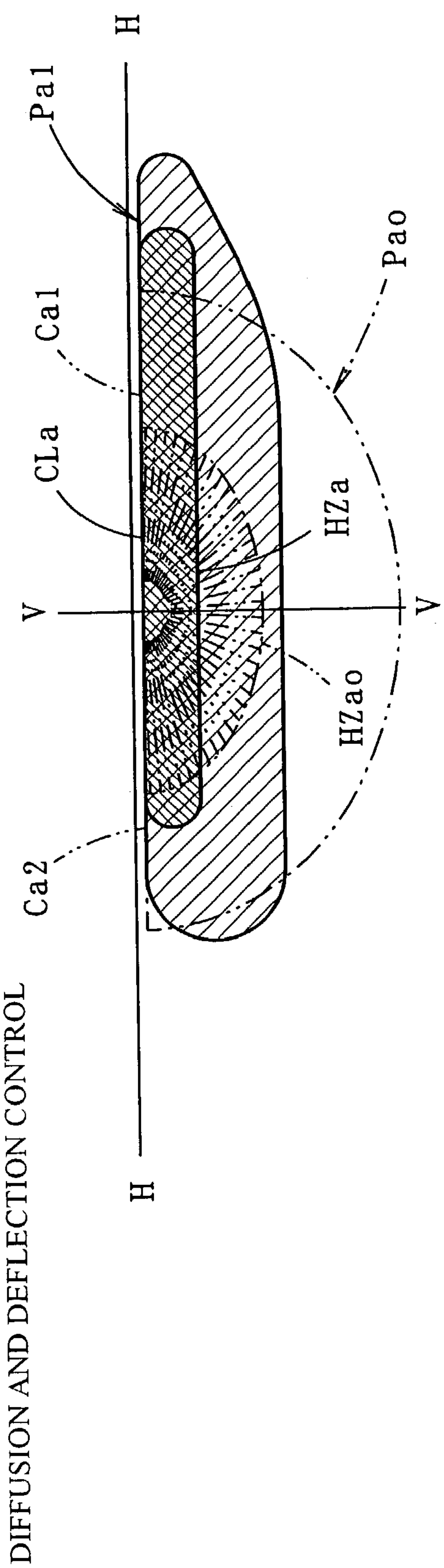

FIGS. 7A and 7B show the first light distribution pattern Pa1 and illustrate its generation.

The light distribution pattern Pao shown by a solid line in FIG. 7A would be formed if the plurality of reflective elements 30*s* were not provided on the reflecting surface 30*a* of the reflector 30 in the case where the reflecting surface 30*a* is a paraboloid of revolution having the optical axis AX2 as its central axis. The light distribution pattern Pao' shown by a chain double-dashed line in FIG. 7A would be formed if the light source bulb 28 were not disposed with its axis tilted.

As is evident from FIG. 7A, the right and left upper end edges Ca1' and Ca2' of the light distribution pattern Pao' extend upward to respective right and left sides at a predetermined angle (7.5°) with respect to the horizontal direction. The light distribution pattern Pao' within the light distribution pattern Po is made to have a relatively flat shape due to the tilted axis of the light source bulb 28. Therefore, both right and left upper end edges Ca1' and Ca 2' extend to the respective right and left sides in the horizontal direction. With this configuration, a hot zone HZao of the light distribution pattern Pao is formed in a relatively flat shape, closer to right and left upper end edges Ca1' and Ca2' than the hot zone HZao' of the light distribution pattern Pao'.

The light distribution pattern Pao is shown by a chain double-dashed line in FIG. 7B. By changing the shape of the light distribution pattern Pao using effects of reflection with diffusion and deflection of the plurality of reflective elements 30*s*, the first light distribution pattern Pa1 shown by a solid line in FIG. 7B is formed. The horizontal cut-off line CLa of the first light distribution pattern Pa1 is formed by diffusing and deflecting the light forming the right and left upper end edges Ca1' and Ca2' in the horizontal direction. In addition, the hot zone HZa of the first light distribution pattern Pal is formed by diffusing and deflecting the light forming the hot zone HZao of the light distribution pattern Pao in the horizontal direction along the horizontal cut-off line CLa.

With further reference to FIG. 7B, the first light distribution pattern Pa1 and the light distribution patterns Pao' and Pao are indicated, which are generated using the H–V intersection as a reference. As mentioned above, since the optical axis Ax2 of the cornering lamp unit 18 is oriented outward in the widthwise direction of the vehicle (leftward direction) at a predetermined angle (approximately 30°), the first light distribution pattern Pa1 is formed at a position displaced leftward at a predetermined angle with respect to the H–V intersection.

As mentioned above, beam control of the cornering lamp unit 18 is carried out by the control unit 50 in accordance with driving conditions. More specifically, beam control is conducted by controlling the illumination and extinguishing of the light source bulb 28 and switching illumination between the front filament 28*a* and the rear filament 28*b*.

In order to achieve this, as shown in FIG. 1, a headlamp switch 52 for controlling the headlamp unit 16, a turn signal switch 54 which operates a direction indicator (turn signal), a steering angle sensor 56 which detects the steering angle of the vehicle, and a vehicle speed sensor 58 which detects the speed of the vehicle are connected to the control unit 50.

The control unit 50 illuminates the light source bulb 28 in the case where the headlamp unit 16 is illuminated and when a steering operation is being performed so as to turn the vehicle to the left or when a left turn is indicated with the turn signal switch 54, and otherwise extinguishes the light source bulb 28. When the light source bulb 28 is illuminated, if the speed of the vehicle is low, namely, when the speed of the vehicle is equal to or less than a predetermined speed (for example, 40 km/h), the rear filament 28*b* is illuminated. On the other hand, if the vehicle speed reaches medium and high speeds, that is, more than the set vehicle speed, the front filament 28*a* is illuminated.

Figures 8A, 8B:
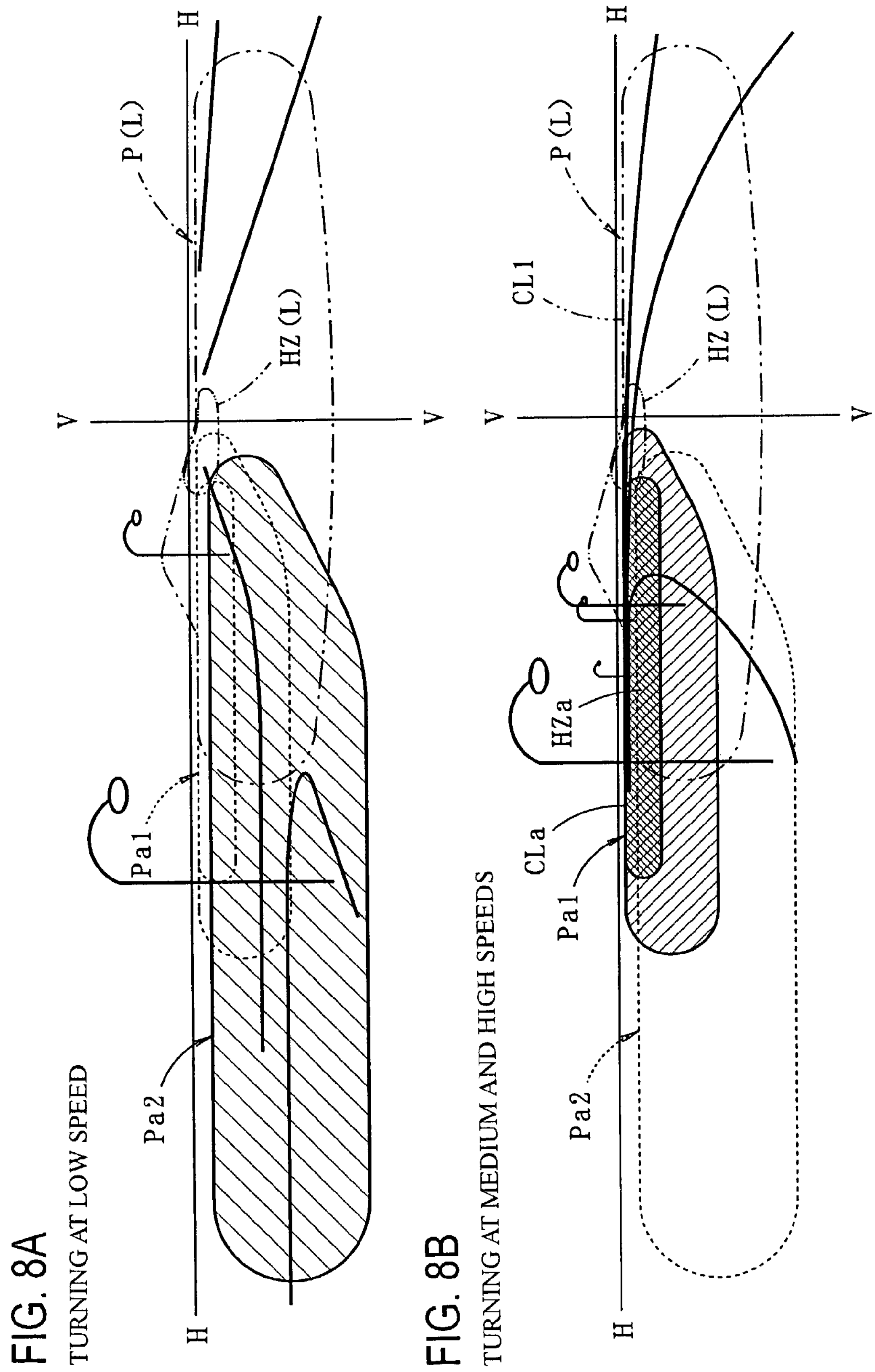
FIG. 8A shows a first light distribution pattern formed by the cornering lamp unit on a virtual vertical screen set 25 m in front of the lamp.
FIG. 8B shows a second light distribution pattern formed by the cornering lamp unit on such a screen.

FIGS. 8A and 8B show light distribution patterns formed by the beam from the cornering lamp unit 18 on a virtual vertical screen set 25 m in front of the lamp for low speeds and medium or high speeds, respectively, as well as the road in front of the vehicle.

More specifically, FIG. 8A shows the second light distribution pattern Pa2 formed when the vehicle turns to the left at a low speed.

When the vehicle turns to the left, the turn signal is operated in advance, and the light source bulb 28 of the cornering lamp unit 18 is illuminated. At such times, the vehicle is generally operated at a low speed, and hence the rear filament 28*b* is illuminated, so that the second light distribution pattern Pa2 is formed on the road surface in front of the vehicle by light reflected from the lower reflecting area 30*a*L.

The second light distribution pattern Pa2 has a substantially uniform light intensity and spreads widely in the leftward direction from the left end portion of the low-beam light distribution pattern P (L). Therefore, the road surface can be widely and substantially uniformly illuminated over short distances, including the road to the left into which the vehicle is turning.

FIG. 8B shows the first light distribution pattern Pa1 which is produced when the vehicle is turning to the left at medium and high speeds, for example, when exiting from a highway.

When the vehicle is traveling along a road curving to left, the light source bulb 28 of the cornering lamp unit 18 is illuminated. At such times, the vehicle is generally traveling at a medium or high speed, and hence the front filament 28*a* is illuminated. Thus, the first light distribution pattern Pa1 is formed by light reflected from the upper reflecting area 30*a*U on the road surface in front of the vehicle.

The first light distribution pattern Pa1 is a pattern of relatively high intensity which extends from the position of the hot zone HZ of the low-beam light distribution pattern P (L) to the left in a relatively flat shape. The upper end edge of the first light distribution pattern Pa1 is formed as the horizontal cut-off line CLa extending in a horizontal direction to substantially the same height as the horizontal cut-off line CL1 of the low-beam light distribution pattern P (L). In addition, a hot zone HZa is formed which extends in an oblong pattern in the horizontal direction along the horizontal cut-off line CLa. With this pattern of illumination, the surface of the road in the turning direction is brightly illuminated for a relatively long distance.

By switching between the front filament 28*a* and the rear filament 28*b*, the output beam is radiated in the second light distribution pattern Pa2 only when the vehicle is turning while driving at a low speed, in which case the first light distribution pattern Pa1 is not formed. The first light distribution pattern Pa1 provides, sufficiently bright illumination of the road surface over relatively short distances. On the other hand, when turning while driving at medium and high speeds, the output beam is radiated only in the first light distribution pattern Pa1 and the second light distribution pattern Pa2 is not formed. The second light distribution pattern Pa2 provides good road visibility over relatively long distances.

As described in detail above, the vehicular lamp 10 according to the present invention has functions both as a headlamp and a cornering lamp. The cornering lamp unit 18 includes a light source bulb 28 having a bulb shade 28*c* which blocks the path of light from the front filament 28*a* to the lower reflecting area 30*a*L on the reflecting surface 30*a* of the reflector 30 so as to allow light to reach only the upper reflecting area 30*a*U. Also, the cornering lamp unit 18 includes the upward light blocking shade 34 provided above and in the vicinity of the light source bulb 28 which blocks the path of light from the rear filament 28*b* to the upper reflecting area 30*a*U so as to allow light to reach only the lower reflecting area 30*a*L. Accordingly, the active area of the reflecting surface of the reflector 30 can be changed by switching between the front filament 28*a* and the rear filament 28*b*. Thus, the cornering lamp unit 18 is capable of radiating a beam having a light distribution pattern determined in accordance with the current driving conditions.

When the front filament 28*a* is illuminated, a beam is radiated on a long distance area of the road surface in front of a vehicle (in the turning direction) using the first light distribution pattern Pa1, which is relatively small and of high light intensity and which is formed using the light reflected from the upper reflecting area 30*a*U. On the other hand, when the rear filament 28*b* is illuminated, a beam is radiated on a short distance area of the road surface in front of the vehicle (such as an approach road to the left) in the second light distribution pattern Pa2, which is relatively large and substantially uniform in light intensity, using the light reflected from the lower reflecting area 30*a*U.

Since the light source bulb 28 is supported by the reflector 30 with its central axis Axb tilted upward at a predetermined angle with respect to the optical axis Ax2 of the reflector 30, the usable luminous flux of the front filament 28*a* can be increased. In addition, due to the upwardly tilted axis the first light distribution pattern Pa1 formed by light reflected from the upper reflecting area 30*a*U has a horizontal cut-off line CLa with a clear upper end edge and a hot zone HZa formed along the horizontal cut-off line CLa, thus improving long distance visibility on the road surface in front of the vehicle.

According to the above-described embodiment of the present invention, it is easily possible to radiate a beam in a light distribution pattern determined in accordance with current driving conditions, thus significantly increasing visibility on the road surface in front of the vehicle. Moreover, this is achieved by the very simple expedient of switching between the front filament 28*a* and the rear filament 28*b* of the single light source bulb 28.

In addition, in this embodiment of the present invention, the rear filament 28*b* is illuminated while driving at low speeds, and the front filament 28*a* is illuminated while driving at medium and high speeds. Therefore, while driving at low speeds with the driver's eyes concentrated on the short distance road surface, the short distance road surface is widely and substantially uniformly illuminated, while most of the long distance road surface is not illuminated in the second light distribution pattern Pa2. On the other hand, while driving at medium and high speeds where the driver's eyes are on the long distance road surface, the long distance road surface is illuminated brightly and most of the short distance road surface is not illuminated in the first light distribution pattern Pa1. Thus, visibility is further increased by illuminating the road surface in front of the vehicle with a light distribution pattern designed to provide the best visibility to the driver when driving from low to medium and high speeds.

In this embodiment of the present invention, the cornering lamp unit 18 may be illuminated only when the headlamp unit 16 is in its low beam state or only when the headlamp unit 16 is in a high beam state. Alternatively, the cornering lamp unit 18 may be configured so as to be illuminated separately and independently of the headlamp unit 16.

Moreover, in this embodiment of the present invention, both the cornering lamp unit 18 and the headlamp unit 16 are accommodated in a lamp chamber formed by the translucent cover 12 and the lamp body 14. It is to be noted though that the cornering lamp unit 18 can be formed as an independent lamp, while the same effects as those of the above-described embodiment can be obtained.

Further, in the above-described embodiment of the present invention light distribution control is provided by the reflector 30 of the cornering lamp unit 18. However, the light distribution control function can also be achieved by lens elements formed on the translucent cover 12.

In this embodiment of the present invention, the cornering lamp unit 18 has been described with reference to the case where the road surface in front of the vehicle in the leftward turning direction is illuminated, for which purpose the vehicular lamp 10 is mounted at a left corner portion of the front end of the vehicle. However, the invention is equally applicable to a cornering lamp unit configured so as to illuminate the road surface in front of the vehicle in the rightward turning direction and the lamp is adapted to be mounted at a right corner portion of the front end of the vehicle.

A lamp configuration for producing a beam having the first light distribution pattern Pa1 shown in FIG. 6B and the second light distribution pattern Pa2 shown in FIG. 6A has been explained. However, if the orientation of the optical axis Ax2 and the surface shape of the reflecting surface 30*a* are established such that a first light distribution pattern Pa3 as shown in FIG. 9B is formed by light reflected from the upper reflecting area 30*a*U of the reflecting surface 30*a* and a second light distribution pattern Pa4 as shown in FIG. 9A is formed by light reflected from the lower reflecting area 30*a*L of the reflecting surface 30*a*, it is possible to produce a beam having the first light distribution pattern Pa3 or the second light distribution pattern Pa4 when the vehicle is traveling in a straight-ahead direction using a lamp configuration which is otherwise the same as that of the above-described embodiment.

Figure 9A:
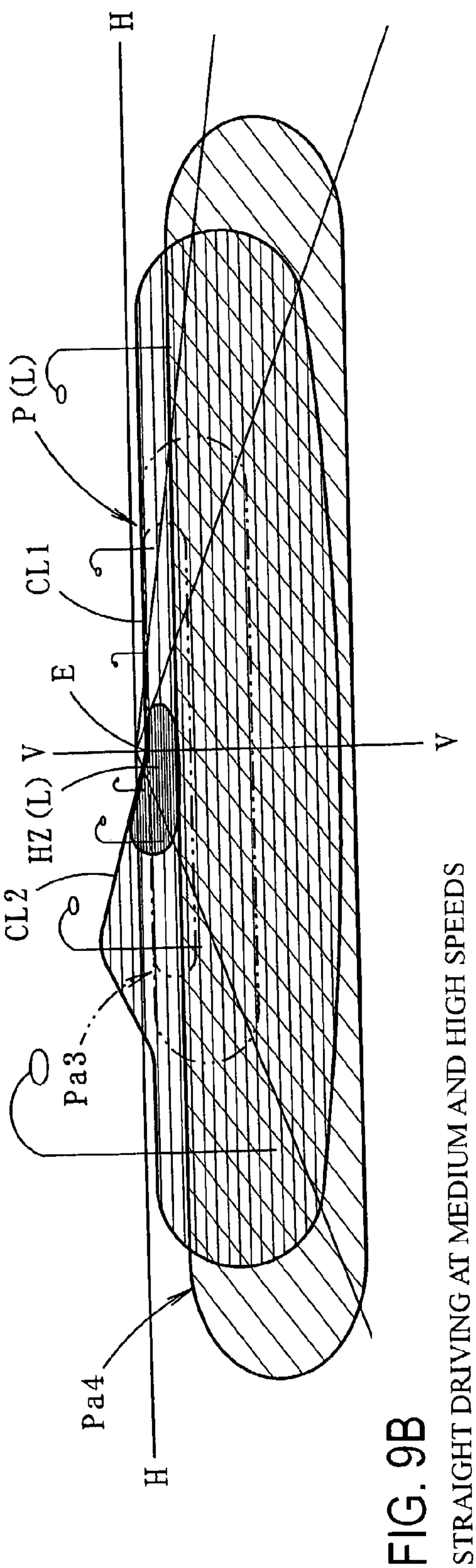
FIGS. 9A and 9B show a perspective view showing the first and second light distribution patterns which are formed on the virtual vertical screen by beam radiation from the cornering lamp unit according to a modified example as well as the low-beam light distribution pattern.
Figure 9B:
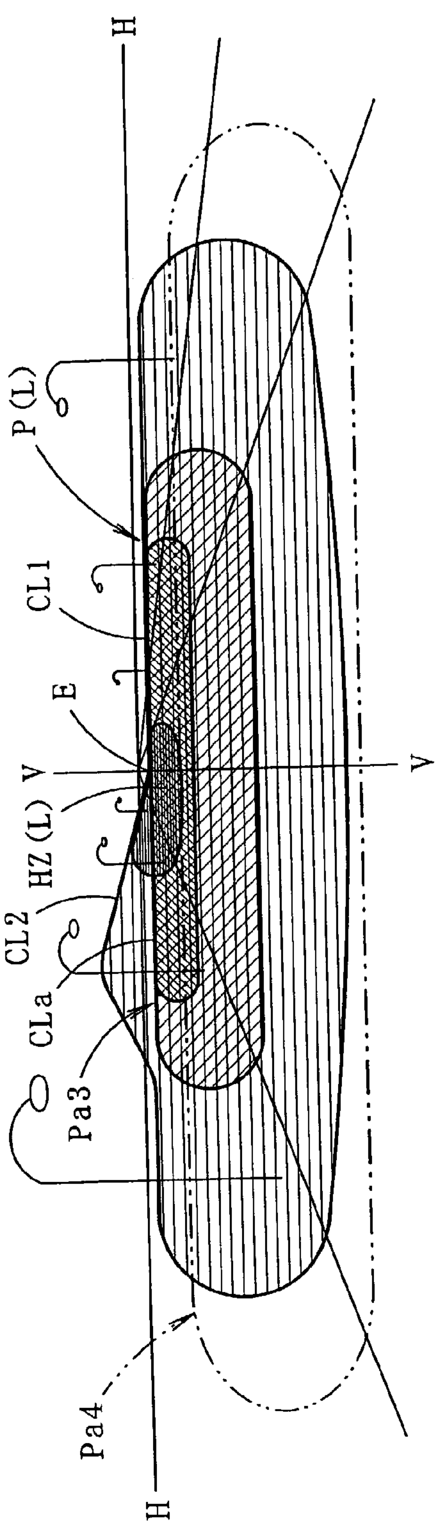
Figure 10A:
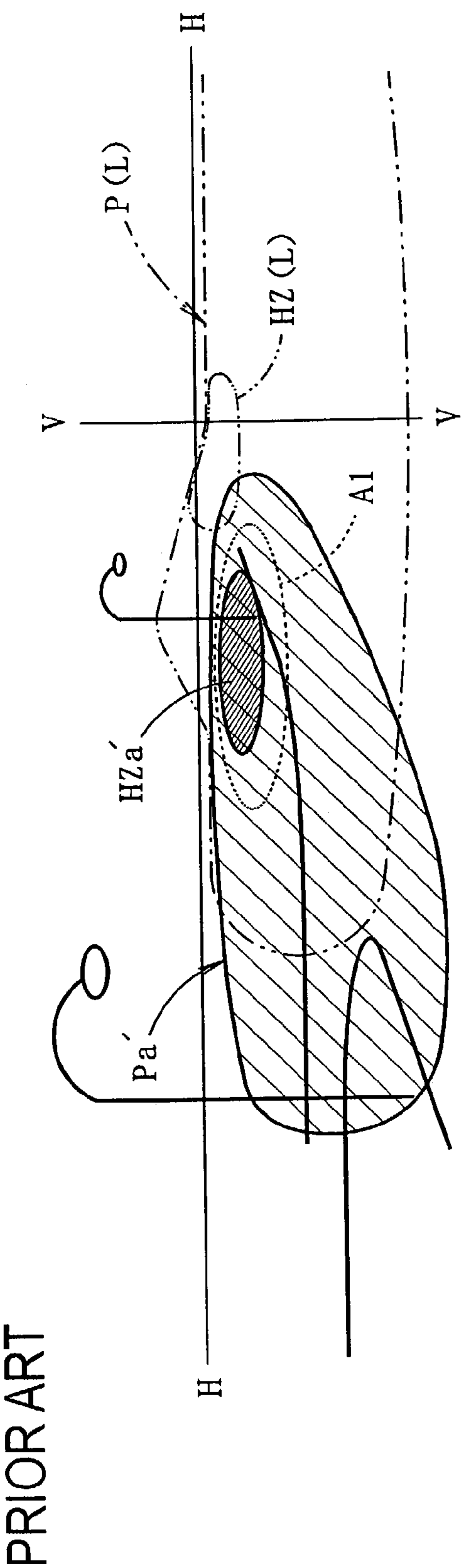
FIGS. 10A and 10B are views similar to FIGS. 8A and 8B showing a conventional vehicular lamp of the same general type as the invention.
Figure 10B:
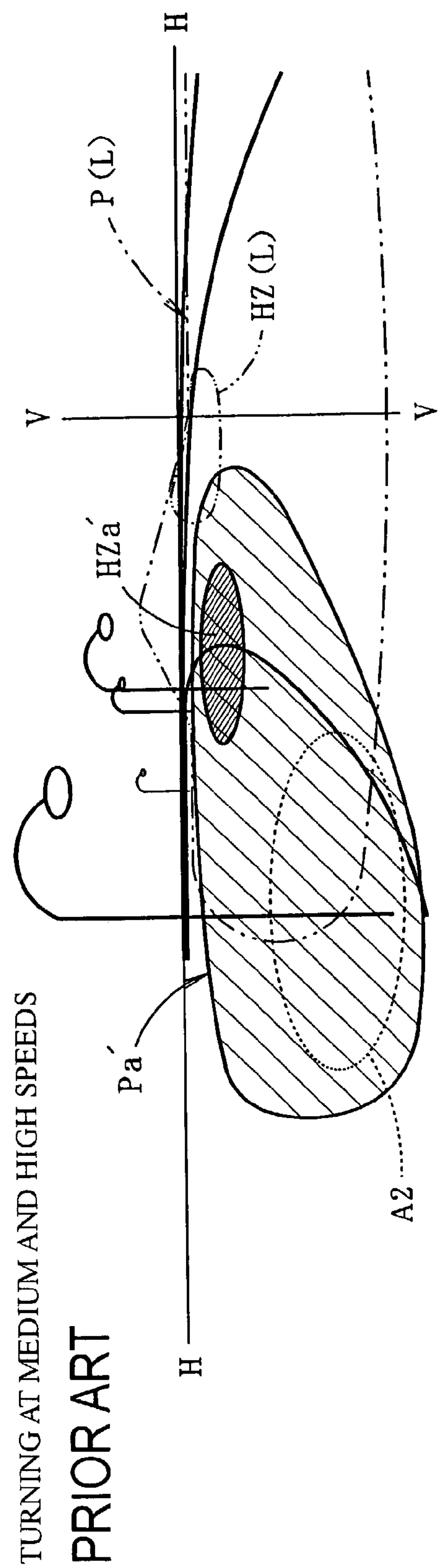

That is, as shown in FIG. 9A, while driving straightward at low speeds, the short distance road surface can be widely and substantially uniformly illuminated with the large second light distribution pattern Pa4 while most of the long distance road surface is not illuminated. On the other hand, while driving straightward at medium and high speeds, as shown in FIG. 9B, the long distance road surface can be brightly illuminated with the smaller first light distribution pattern Pa3 while most of the long distance road surface is not illuminated. Thus, by suitable choice of lamp configuration, the brightness of the low-beam light distribution pattern P (L) (or the high-beam light distribution pattern) can be effectively reinforced.

It should further be apparent to those skilled in the art that various changes in form and detail of the invention as shown and described above may be made. It is intended that such changes be included within the spirit and scope of the claims appended hereto.

What is claimed is:

1. A vehicular cornering lamp comprising:

a light source bulb comprising first and second light sources, a reflector having first and second reflecting areas, a first shade for preventing light from said first light source from reaching said second reflecting area, and a second shade for preventing light from said second light source from reaching said first reflecting area, said first light source and said first reflecting area forming a first beam, said second light source and said second reflecting area forming a second beam, and said first beam illuminating an area farther from said lamp than said second beam.

2. A vehicular cornering lamp comprising:

first and second light sources, a reflector having first and second reflecting areas, a first shade for preventing light from said first light source from reaching said second reflecting area, a second shade for preventing light from said second light source from reaching said first reflecting area, said first light source and said first reflecting area forming a first beam, said second light source and said second reflecting area forming a second beam, and said first beam illuminating an area farther from said lamp than said second beam, and means for illuminating said first light source when a vehicle upon which said cornering lamp is mounted is turning at a speed above a predetermined speed and illuminating said second light source when said vehicle is turning at a speed below said predetermined speed.

3. The vehicular cornering lamp according to claim 1, wherein said second beam is broader than said first beam.

4. A vehicular cornering lamp comprising:

first and second light sources, a reflector having first and second reflecting areas, a first shade for preventing light from said first light source from reaching said second reflecting area, a second shade for preventing light from said second light source from reaching said first reflecting area, said first light source and said first reflecting area forming a first beam, said second light source and said second reflecting area forming a second beam, and said first beam illuminating an area farther from said lamp than said second beam, wherein said first reflecting area is above said second reflecting area.

5. The vehicular cornering lamp according to claim 4, wherein said first light source comprises a first filament of a light source bulb and said second light source comprises a second filament of said light source bulb.

6. The vehicular cornering lamp according to claim 5, wherein said first filament is positioned forward of said second filament in said light source bulb.

7. The vehicular cornering lamp according to claim 5, wherein said first shade comprises a bulb shade provided within said light source bulb adjacent said first filament.

8. The vehicular cornering lamp according to claim 5, wherein said light source bulb is supported by said reflector with a bulb central axis of said light source bulb tilted upward with respect to an optical axis of said reflector at a predetermined angle.

9. A vehicular lamp comprising: a light source bulb and a reflector having a reflecting surface for reflecting light from said light source bulb, said reflecting surface being configured to radiate beams of light toward a road surface in front of a vehicle on which said lamp is mounted in predetermined light distribution patterns, said light source bulb comprising a front filament and a rear filament positioned substantially serially along a central axis of said bulb, a bulb shade provided below and adjacent said front filament for blocking light from said front filament from reaching a lower reflecting area of said reflecting surface while allowing light from said front filament to strike only said upper reflecting area of said reflecting surface, and a second shade provided above and adjacent said light source bulb for blocking light from said rear filament from reaching said upper reflecting area while allowing light from said rear filament to strike only said lower reflecting area, a first light distribution pattern formed on a road surface in front of said vehicle by light reflected from said upper reflecting area when said front filament is illuminated being formed farther from said vehicle than a second light distribution pattern formed on said road surface in front of said vehicle by light reflected from said lower reflecting area when said rear filament is illuminated.

10. The vehicular lamp according to claim 9, wherein said bulb shade surrounds said front filament at a predetermined center angle of less than 180°, and wherein said light source bulb is supported by said reflector with a bulb central axis of said light source bulb tilted upward with respect to an optical axis of said reflector at a predetermined angle.

11. The vehicular lamp according to claim 9, wherein a diffusion angle in a horizontal direction of said first light distribution pattern is smaller than a diffusion angle in a horizontal direction of said second light distribution pattern.

12. The vehicular lamp according to claim 9, further comprising a control unit for illuminating said rear filament when a vehicle speed is equal to or less than a predetermined vehicle speed and illuminating said front filament when said vehicle speed is greater than said predetermined vehicle speed.

13. The vehicular lamp according to claim 9, wherein said control unit receives input signals from a headlamp switch, a turn signal switch, a steering angle sensor, and a vehicle speed sensor.

14. The vehicular lamp according to claim 9, further comprising a headlamp unit mounted adjacent said reflector.

15. The vehicular lamp according to claim 1, wherein the first and second light sources are filaments of the light source bulb.

* * * * *